United States Patent
Mallison et al.

(10) Patent No.: US 6,840,110 B2
(45) Date of Patent: Jan. 11, 2005

(54) APPARATUS TO MEASURE DIFFERENTIAL PRESSURE WITH SETTABLE PRESSURE REFERENCE

(75) Inventors: Edgar Robert Mallison, Wayzata, MN (US); Thomas George Stratton, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 48 days.

(21) Appl. No.: 10/128,013

(22) Filed: Apr. 23, 2002

(65) Prior Publication Data

US 2003/0196493 A1 Oct. 23, 2003

(51) Int. Cl.$^7$ .............................................. G01L 15/00
(52) U.S. Cl. ......................................... 73/716; 73/714
(58) Field of Search .................................. 73/700–756

(56) References Cited

U.S. PATENT DOCUMENTS 5,461,901 A * 10/1995 Ottestad ..................... 73/1.63
5,584,278 A * 12/1996 Satoh et al. ................. 123/516

FOREIGN PATENT DOCUMENTS

| EP | 430681 A2 | * | 6/1991 | ............. G01L/9/00 |
| JP | 05026704 A | * | 2/1993 | ............. G01F/1/37 |

OTHER PUBLICATIONS

Honeywell Engineering Specification No. 51198142, Mar. 6, 2000, p. 5.

* cited by examiner

Primary Examiner—Edward Lefkowitz
Assistant Examiner—Jermaine Jenkins
(74) Attorney, Agent, or Firm—Mathew Luxton

(57) ABSTRACT

A differential pressure sensor for sensing changes in pressure at a desired location, which sensor includes a sensing portion and a reference portion to produce an output indicative of the difference therebetween, both the sensing portion and the reference portion being open to the pressure around the sensor until the sensor is located in the desired sensing location and then the reference portion is closed to capture the pressure then existing at the desired location and any pressure changes thereafter producing signals indicative of the pressure differences.

24 Claims, 1 Drawing Sheet

APPARATUS TO MEASURE DIFFERENTIAL PRESSURE WITH SETTABLE PRESSURE REFERENCE

BACKGROUND OF THE INVENTION

1. Field of the Invention

The present invention is in the field of pressure sensors and, more particularly, differential pressure sensors.

2. Description of the Prior Art

In order to measure pressure differences, it has long been common to use an absolute pressure sensor and determine two consecutive readings, the difference therebetween being the pressure differential. It is also common to use a pressure sensor which employs a predetermined reference pressure and detects the difference between the sensed pressure and the reference pressure. Honeywell makes pressure sensors that operate on both principles and are known as PPTR3000AP2VB (absolute pressure sensor) and PPTR3000GP2VB (reference pressure is ambient atmosphere) respectively.

SUMMARY OF THE INVENTION

In some situations where it is very expensive or difficult to place and replace pressure sensors or, where high absolute pressures are encountered and small pressure differences are to be detected, such as, for example, in oil well applications where using a plurality of pressure sensors located at various locations along a pipe may be used to determine the flow rate of the oil being pumped from a deep well, neither type of pressure sensor may be able to provide an accurate and easily usable differential pressure sensor. For example, in the oil-pumping situation, the pressure on the oil at various positions along the pipe may be as high as 25,000 psi, and a change of 1 psi may be considered significant. Providing a sensor that can accurately measure a difference of 1 psi between two consecutive readings, i.e., one part in 25,000, is extremely difficult and, at least, would be very expensive. When using a pressure sensor that operates with respect to a reference pressure the problem is eased because the reference pressure can be pre-set to about the same as the sensed pressure. Thus, a sensor with an accuracy of 1 part in 100 can be used to detect a small psi change in a high absolute pressure environment. While more practical for measuring small pressure differences, use of a reference pressure becomes extremely cumbersome and expensive when they are required to be used at various locations in the pipe, particularly when the absolute pressure to which the sensor is to be subjected is not known, or which varies along the pipe length. Under such conditions, having a pre-set reference pressure source is rather impractical. While trial and error may be used, frequent withdrawing of the sensor from a desired location in the pipe in order to replace the reference pressure source to match the ambient pressure at the desired location and then re-inserting it back to the desired location is prohibitively difficult and costly.

The present invention avoids the above problems by providing a reference chamber that, like the sensing chamber, is open to the ambient pressure as the sensor is positioned at the desired location. The fluid filling the reference chamber is thus automatically equal to the ambient pressure at that location. Once the reference pressure is established, the reference chamber may then be closed or sealed off from the ambient pressure and the pressure in the reference chamber remains fixed while the sensing chamber continues to sense the ambient pressure. The difference between the sensed pressure and the reference pressure is thereafter measured and small changes (e.g., 1 psi) are easily detected with a far less expensive detector (e.g., one with an ability to accurately measure 1 part in 100).

DETAILED DESCRIPTION OF THE PREFERRED EMBODIMENTS

Figure 1:
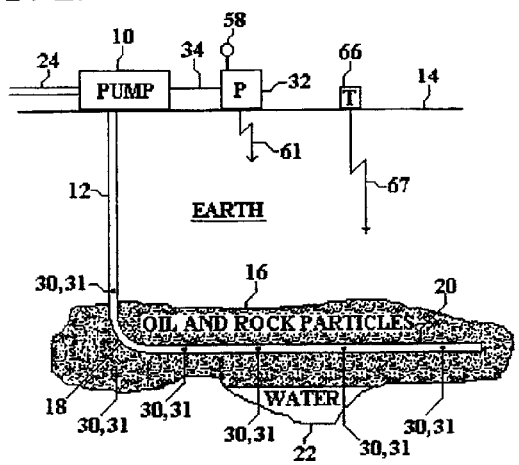
FIG. 1 shows a cross-section of a simplified oil pumping arrangement.

Referring to FIG. 1, a pump 10 is shown connected to an underground pipe 12 which extends down from the earth surface 14 to a pool of fluid 16, which will be considered a pool of oil in the following description. The oil is usually mixed with sand or other earth materials. It should be noted that oil can be removed from an underground location by other methods, such as application of pressures, without the use of a pump and the word "pump" herein should be read to include other forms of removal. Also, the invention may be used during the drilling process to detect pressure changes and pipe 12 may be a drill hole. As used herein, "pipe" should be read to include any conduit or orifice including a hole. In any event, pipe 20 may change directions such as at bend 18 and thereafter extend through the oil pool 16 along a pipe (or hole) portion 20. In some cases, pockets of water such as shown by reference numeral 22 may lie adjacent portions of oil pool 16. Pump 10 operates to pump oil from pocket 16 through pipes 12 and 20, and out through an outlet pipe 24 to a down stream receiver (not shown). However, oil exhausted too quickly may cause water to rush into any void created by the oil migration and accordingly, it is extremely important to control the rate of pumping and avoid any water from entering pipes 12 and 20. Thus, a very accurate measure of flow is needed.

In order to measure the flow of oil in pipes 12 and 20, a plurality of pressure sensors 30 are positioned at various positions or locations 31 along pipes 12 and 20. While a half dozen such sensors are shown in FIG. 1, different numbers of sensors may be used in actual practice. Furthermore, as will be shown, the positions of the sensors may be changed from time to time. The pressure sensors 30 (an example of which will be described in connection with FIGS. 2 and 3) operate to detect pressure changes, i.e., pressure differences at the various locations, and these signals are sent to a processor 32 which is shown in FIG. 1 connected to pump 10 by a line 34 so that, using well-known techniques, the rate of flow or flow field along the pipes 12 and 20 can be determined and used to control the flow rate. It will be understood, that the oil pressure along the pipes may be from around 6000 psia to as high as about 25,000 psia and that it may be desired to detect pressure variations of less than 1 psi to measure flow accurately. It will also be understood that placing a large number of sensors at desired locations is a rather difficult and time-consuming procedure which makes it desirable, in many cases, to use sensors that will not have to be removed and reinstalled.

Figure 2:
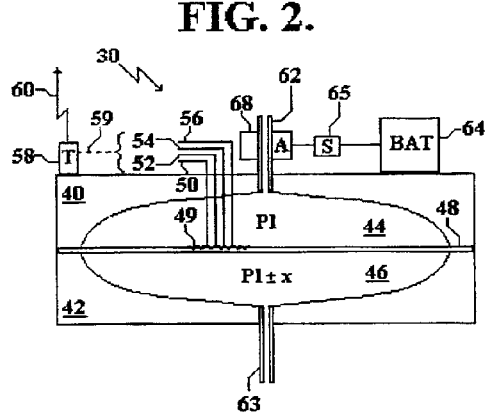
FIG. 2 shows a cross-section of a differential pressure sensor with a sensing and reference chamber both open to the ambient pressure.
Figure 3:
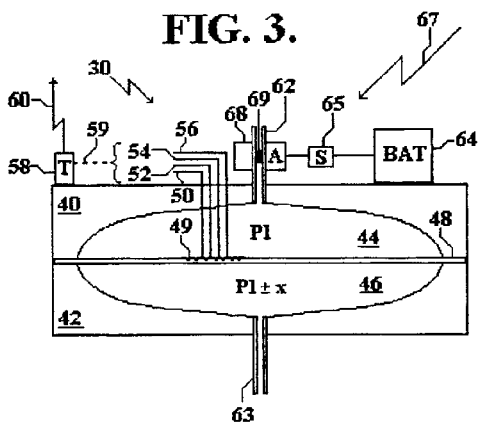
FIG. 3 show a cross-section of the differential pressure sensor of FIG. 2 with the reference chamber sealed off from the ambient pressure; and, FIG. 4 shows a schematic representation of a device for controlling the flow in a conduit.

FIGS. 2 and 3 show a cross-section of an example of one of the pressure sensors 30 of the present invention. In the figures, an upper housing 40 and a lower housing 42 are shown providing upper and lower chambers 44 and 46 respectively. A ceramic, silicon, or other deformable material diaphragm 48 is held between the upper housing 40 and lower housing 42 and the shape of chambers 44 and 46 allows material 48 to bend upward and downward as the pressure difference therebetween changes. Sensors such as one or more piezoresistive devices 49 are fixed, etched, or otherwise connected to the surface, or integrated into the diaphragm of material 48, and may be connected to form a Wheatstone bridge that produces electrical signals indicative of the deformation of the material 48 and thus of the pressure differential between chambers 44 and 46. These signals may be conducted such as by wires 50, 52, 54, and 56 leading out of the pipes 20 and 12 through pump 10 and line 34 to processor 32 in FIG. 1 or, alternately, the signals may be fed to a transmitter 58 as shown by dashed line connection 59 to send sonic, or r-f signals as shown be arrow 60 directly to the processor 32. In either case, the processor 32 operates on the signals in a well-known manner to determine the pressures being sensed and the flow field involved. Processor 32 may also provide a visual pressure/flow signal, for example at an indicator 58, and/or may provide control signals to alter the operation of pump 10 via connection 34 in such a way as to control the flow rate through pipes 12 and 20. Alternate methods for controlling the flow in pipes 12 and 20 may include use of choke devices for causing variation in the cross sectional area of the pipes or sphincter valves controlled by signals from the processor 32 as shown by arrow 61. One such device will be explained in connection with FIG. 4.

As mentioned, pipes 12 and 20 could also represent boreholes in an oil field and the ambient portion of the differential pressure could be opened and closed while drilling to give pressure changes over time at various locations. This would provide for taking pressure measurements at different locations. For such applications, a pump is not necessary.

In FIGS. 2, and 3, one or more pipes such as pipes 62 and 63 are shown passing through upper and lower housings 40 and 42 respectively and into chambers 44 and 46 to permit the flow of fluid from the ambient oil therein. Sensors of this general type are well known in the industry and an example of such a sensor is found in the above-mentioned Honeywell sensor PPTR3000GP2VB.

In the present invention, both pipes 62 and 63 are exposed to the same ambient pressure, P1. Then, after an equilibrium has been reached, one of the pipes (say pipe 62) is closed, as, for example, by an on-board means such as a battery pack 64 and a switch 65, that may be opened and closed by a surface command as, for example, by a wire through conduits 12 and 20, or by a signal from a control transmitter 66 operable to transmit activation signals shown by arrows 67 in FIGS. 1 and 3. Activation of switch 65 then operates to energize an actuator 68, which is shown in FIG. 3 as operable to activate a closer such as a valve 69 that blocks pipe 62 and seals the chamber 44 from the ambient, thereby making pressure P1 in chamber 44 fixed so that no further changes in pressure will occur therein. From then on, the pressure changes will effect chamber 46 and not chamber 44 so that the differential pressure between P1 and P1± a small variation x is measured. It will be noted that both chambers are subject to the same temperature and pressure environment and both use the same sensor, thereby significantly reducing many temperature, pressure, and hysteresis errors. Pressure sensors able to withstand very high temperatures may also be employed thereby allowing the use of the present invention in very high temperature environments. If it is desirable to reopen pipe 68 at a later time so that a new reference pressure may be used in chamber 44, (for example to allow the sensor 30 to be moved to an alternate location) then actuator 68 could be activated by another signal 67 from transmitter 66 to open valve 68, thus allowing a new reference pressure to enter chamber 44. While the manner of closing the pipe 60 has been shown with a battery pack 64, switch 65, actuator 68, and valve 69, any suitable methods may be employed. For example, if reopening of pipe 62 is not needed, then an explosive charge might be activated by the surface transmitter 66 which would deform pipe 60 by bending or crimping it.

Figure 4:
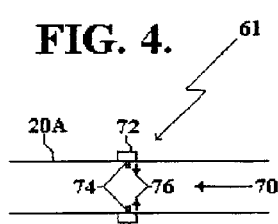

In addition to controlling the pump 10, FIG. 4 shows another possible way of controlling the flow through pipes 12 and 20. In FIG. 4, a section of pipe 20A is shown with a flow shown by arrow 70 going therethrough. A clutch or valve mechanism 72 is shown around pipe 20A and has associated therewith a closing member 74 extending into pipe 20A, and movable into and out of the flow as shown by double-ended arrow 76. A desired flow signal from the processor 32, as shown by arrow 61, activates valve mechanism 72 to move members 74 into or out of the flow 70 to thereby change the cross-sectional area of pipe 20A and thus control the flow. One or more valve mechanisms like 72 may be employed along the lengths of pipes 12 and 20.

It is thus seen that we have provided a novel, reliable pressure, and highly accurate differential sensor suitable for use in various difficult situations. Many changes will occur to those having skill in the art. For example, while an oil-pumping situation is used to describe the invention in a preferred environment, other situations such as chemical production plants, food-processing plants, paint mixing and production plants could also find the present invention useful. At least two sensors are need for a determination of flow, but a single sensor could be used for determining variations in fluid level. For example, a sensor such as sensor 30 may be lowered into a container in which the fluid level varies. The sensor could be positioned at a desired depth in the container and chamber 44 sealed off to provide a reference pressure. Then as fluid level changed, the pressure in chamber 46 would change (but not in chamber 44) and the output representing the differential pressure would be indicative of the change in fluid level.

Many changes to the present invention will occur to those skilled in the art. For example, in addition to those mentioned above, other uses for the invention, other ways of transmitting the signals from the sensor to the remote signal processing equipment and from the transmitter or processor to the sensor may be devised and, other methods for sealing pipe 62 may be employed and while single pipes 62 and 63 have been shown for admitting the ambient pressure into chambers 44 and 46, two or more conduits may be used for each chamber. Accordingly, we do not wish to be limited to the specific structures shown in connection with the preferred embodiments. The following claims define the scope of the present invention.

What is claimed is:

1. A pressure sensor for determining uncontrolled changes of pressure occurring at a desired location comprising:
   a sensing portion exposed to the pressure at the desired location;
   a reference portion having a conduit to temporarily expose the reference portion to the pressure at the desired location; and
   a closer operable to close the conduit after the pressure sensor is positioned at the desired location so as to capture the then existing pressure in the reference portion and thereafter, changes in pressure at the desired location affecting the sensing portion but not the reference portion so that the pressure sensor produces an output indicative of the pressure difference between the sensing portion and the reference portion.

2. The pressure sensor of claim 1 wherein the closer comprises an on-board activation device.

3. The pressure sensor of claim 2 wherein the activation device is activated by a remote command signal.

4. Apparatus according to claim 1 further including a second pressure sensor producing a second output positioned at a second desired location and wherein the output and the second output may be used to provide signals to determine fluid flow.

5. The pressure sensor of claim 1 wherein the sensing portion and the reference portion are exposed to a deformable member and the amount of deformation is indicative of the pressure difference between the sensing and reference portions.

6. The pressure sensor of claim 5 wherein the deformable member includes a diaphragm plate positioned between the sensing portion and the reference portion.

7. The pressure sensor of claim 6 wherein the diaphragm plate has piezoresistive transducers associated therewith to sense the deformations of the diaphragm plate to produce electrical signals.

8. The pressure sensor of claim 6 wherein the diaphragm plate comprises a silicon member.

9. The pressure sensor of claim 6 wherein the diaphragm plate comprises ceramic member.

10. The pressure sensor of claim 1 wherein the changes of pressure are in an underground oil pool from which oil may be removed.

11. The pressure sensor of claim 10 wherein the desired location is in a conduit which extends to the oil pool.

12. The pressure sensor of claim 11 further including a second pressure sensor producing a second output positioned at a second desired location in the conduit and wherein the output and the second output are used to provide signals to determine oil flow.

13. The pressure sensor of claim 1 further including a processor to receive the output from the sensor.

14. The pressure sensor of claim 1 further including at least a second pressure sensor for determining the changes of pressure occurring at a second desired location, the second sensor including:
 a sensing portion exposed to the pressure at the second desired location;
 a reference portion having a conduit to temporarily expose the reference portion to the pressure at the second desired location; and
 a closer operable to close the conduit after the pressure sensor is positioned at the second desired location so as to capture the then existing pressure in the reference portion and thereafter, changes in pressure at the second desired location affecting the sensing portion but not the reference portion so that the pressure sensor produces a second output indicative of the pressure difference between the sensing portion and the reference portion at the second desired location, the processor receiving the output and the second output to produce a resultant signal.

15. The method of determining the uncontrolled differential pressure changes of a fluid in a remote source comprising the steps:
 A. positioning a first pressure sensor having sensing and reference portions at a first location in the remote source;
 B. allowing the pressure at the first location to fill the sensing and the reference portions; and,
 C. closing the reference portion to the pressure at the first location so that thereafter, the first pressure sensor produces signals indicative of the difference in pressure between the sensing and reference portions.

16. The method of claim 15 wherein step C includes activating an on-board device by a remotely generated signal.

17. The method of claim 16 wherein step B includes a tube from the reference portion to the remote source and the on-board device of step C includes an actuator operable upon activation to close the tube and further includes the step:
 D. activating the actuator with a remote signal to close the tube when the pressure in the reference portion has reached a desired level.

18. The method of claim 17 further including the step:
 E. reactivating the actuator to reopen the reference portion when a new reference pressure is desired.

19. The method of claim 16 further including the steps:
 F. positioning a second pressure sensor having sensing and reference portions at a second location in the source;
 G. allowing the pressure at the second location to fill the sensing and the reference portions of the second sensor; and,
 H. closing the reference portion of the second sensor to the pressure at the second location so that thereafter, the second sensor produces second signals indicative of the difference in pressure between the sensing and reference portions at the second location.

20. Apparatus for determining the flow of liquid from a remote pool wherein a plurality of pressure sensors are positioned to sense the uncontrolled pressures at a plurality of desired locations in the pool comprising:
 sensing portions for each sensor exposed to the pressure at the desired locations;
 reference portions for each sensor having a conduit to temporarily expose the reference portion to the pressure at the desired locations; and
 a closer for each sensor operable to close the conduit after the pressure sensors are positioned at the desired location so as to capture the then existing pressure in the reference portion so that thereafter, changes m pressure at the desired locations affect the sensing portions but not the reference portions and the pressure sensors produce outputs indicative of the pressure differences at the desired locations.

21. The apparatus of claim 20, further including a processor to receive the outputs from the sensors and to produce a resultant signal indicative of the flow in the pool.

22. Apparatus according to claim 21 further including a pump connected to receive the resultant signal and operable to control the flow to a desired value.

23. Apparatus according to claim 21 further including a clutch located in the flow and operable to receive the resultant signal to expand and contract to control the amount of the flow.

24. Apparatus according to claim 23 wherein the clutch is a variable orifice valve.

* * * * *